US008240680B2

(12) United States Patent
Paganoni

(10) Patent No.: US 8,240,680 B2
(45) Date of Patent: Aug. 14, 2012

(54) SKIING IMPLEMENT HAVING A SIMPLIFIED STRUCTURE

(75) Inventor: Giampietro Paganoni, Fiorano al Serio (IT)

(73) Assignee: Easy-Ski-Bike S.R.L., Ardesio (IT)

( * ) Notice: Subject to any disclaimer, the term of this patent is extended or adjusted under 35 U.S.C. 154(b) by 0 days.

(21) Appl. No.: 11/882,468

(22) Filed: Aug. 1, 2007

(65) Prior Publication Data

US 2009/0033047 A1 Feb. 5, 2009

(51) Int. Cl.
*B62B 19/04* (2006.01)
*B62B 17/08* (2006.01)

(52) U.S. Cl. .................. 280/28.11; 280/845; 280/7.12; 280/7.14

(58) Field of Classification Search ............... 280/7.12, 280/7.14, 845, 14, 15, 16, 28.11
See application file for complete search history.

(56) References Cited

U.S. PATENT DOCUMENTS

| | | | | | |
|---|---|---|---|---|---|
| 1,209,398 | A | * | 12/1916 | Converse | 280/14 |
| 1,663,060 | A | | 3/1928 | Rainey | |
| 1,672,782 | A | * | 6/1928 | Ring | 280/22 |
| 1,809,295 | A | * | 6/1931 | Gundersen | 280/16 |
| 1,968,975 | A | * | 8/1934 | Upsacker et al. | 280/14.28 |
| 2,176,397 | A | * | 10/1939 | Flanders et al. | 280/16 |
| 2,316,272 | A | * | 4/1943 | Meyer | 280/14.28 |
| 2,479,674 | A | * | 8/1949 | Elliott | 280/16 |
| 2,497,995 | A | * | 2/1950 | Julie | 280/7.12 |
| 2,633,365 | A | * | 3/1953 | Cwynar et al. | 280/16 |
| 2,883,205 | A | * | 4/1959 | Dulski | 280/16 |
| 3,139,287 | A | * | 6/1964 | Annis | 280/28.11 |
| 3,178,196 | A | * | 4/1965 | Colace | 280/16 |
| 3,438,643 | A | * | 4/1969 | Spiehs | 280/16 |
| D215,458 | S | * | 10/1969 | Latch et al. | D12/10 |
| 3,482,848 | A | * | 12/1969 | Hellstern | 280/16 |
| D223,267 | S | * | 4/1972 | Molzen et al. | D12/10 |
| 3,682,495 | A | * | 8/1972 | Zaimi | 180/190 |
| 3,799,565 | A | * | 3/1974 | Burtis et al. | 280/16 |
| 3,870,330 | A | * | 3/1975 | Hatano et al. | 280/16 |
| 3,931,983 | A | * | 1/1976 | Kanouse et al. | 280/12.14 |
| 4,027,891 | A | * | 6/1977 | Frame | 280/7.14 |
| 4,204,581 | A | * | 5/1980 | Husted | 180/190 |
| 4,206,828 | A | * | 6/1980 | Husted | 180/184 |
| 5,064,208 | A | * | 11/1991 | Bibollet | 280/21.1 |
| 5,397,154 | A | * | 3/1995 | Baldwin | 280/818 |
| 5,738,361 | A | * | 4/1998 | Landucci | 280/12.14 |
| 5,863,051 | A | * | 1/1999 | Brenter | 280/16 |
| D446,474 | S | * | 8/2001 | Monike et al. | D12/9 |
| 6,279,923 | B1 | * | 8/2001 | Cardillo et al. | 280/12.14 |
| D449,089 | S | * | 10/2001 | Burger | D21/766 |
| D460,137 | S | * | 7/2002 | Burger | D21/767 |
| 6,511,079 | B1 | * | 1/2003 | Charles, Sr. | 280/12.14 |
| 6,626,441 | B1 | * | 9/2003 | Hanson | 280/7.14 |
| 6,663,117 | B2 | * | 12/2003 | Cheney et al. | 280/12.14 |
| 6,736,414 | B2 | * | 5/2004 | Farrally-Plourde | 280/16 |
| 6,739,606 | B2 | * | 5/2004 | Rappaport | 280/87.041 |
| 6,783,134 | B2 | * | 8/2004 | Geary | 280/21.1 |
| 6,935,640 | B2 | * | 8/2005 | Gille et al. | 280/14.28 |
| 6,957,818 | B2 | * | 10/2005 | McClure et al. | 280/14.28 |
| 6,983,941 | B2 | * | 1/2006 | Moscaret et al. | 280/8 |
| 6,994,359 | B1 | * | 2/2006 | Silver | 280/16 |
| 7,104,551 | B2 | * | 9/2006 | Takahashi | 280/14.25 |
| 7,163,209 | B2 | * | 1/2007 | Moscaret et al. | 280/8 |
| 7,182,352 | B1 | * | 2/2007 | Gonzalez | 280/87.021 |
| 7,232,133 | B2 | * | 6/2007 | Stevens | 280/16 |
| 7,240,908 | B2 | * | 7/2007 | Sankrithi | 280/21.1 |
| 7,537,221 | B2 | * | 5/2009 | Lasala | 280/16 |
| 7,540,506 | B2 | * | 6/2009 | Cheney et al. | 280/12.14 |
| 2001/0003392 | A1 | * | 6/2001 | Rappaport | 280/87.041 |
| 2001/0038184 | A1 | * | 11/2001 | Stafford | 280/14.27 |
| 2003/0038434 | A1 | * | 2/2003 | Farrally-Plourde | 280/16 |
| 2003/0080522 | A1 | * | 5/2003 | Cheney et al. | 280/12.13 |
| 2003/0141682 | A1 | * | 7/2003 | Comden | 280/14.28 |
| 2003/0222419 | A1 | * | 12/2003 | Geary | 280/21.1 |
| 2004/0100044 | A1 | * | 5/2004 | Monike et al. | 280/14.1 |
| 2004/0124596 | A1 | * | 7/2004 | Cheney et al. | 280/7.1 |
| 2004/0155416 | A1 | * | 8/2004 | Liu et al. | 280/12.14 |
| 2005/0062240 | A1 | * | 3/2005 | Holt | 280/28.11 |
| 2005/0263967 | A1 | * | 12/2005 | Picariello et al. | 280/7.12 |
| 2006/0151965 | A1 | * | 7/2006 | Calitz | 280/16 |
| 2006/0284389 | A1 | * | 12/2006 | Cheney et al. | 280/7.12 |
| 2008/0196959 | A1 | * | 8/2008 | Cheney et al. | 180/190 |
| 2008/0258414 | A1 | * | 10/2008 | Ferron | 280/16 |

FOREIGN PATENT DOCUMENTS

| | | |
|---|---|---|
| CA | 1 003 464 A | 1/1977 |
| DE | 200 20 978 U1 | 2/2001 |
| FR | 2 831 127 A | 4/2003 |
| WO | WO 03/106241 A | 12/2003 |

* cited by examiner

*Primary Examiner* — J. Allen Shriver, II
*Assistant Examiner* — Travis Coolman
(74) *Attorney, Agent, or Firm* — Hess Patent Law Firm PC; Robert J. Hess

(57) ABSTRACT

A skiing implement having a simplified structure, comprising an elongated frame which defines, in a central portion, supports for the feet of a user and, at the front end, a head tube for rotary engagement with a steering column; there are also provided a front ski, which is connected to the lower end of the column, and a rear ski, which is connected to the rear end of the frame; the skis are connected so that they can oscillate about substantially horizontal axes.

13 Claims, 4 Drawing Sheets

SKIING IMPLEMENT HAVING A SIMPLIFIED STRUCTURE

The present invention relates to a skiing implement having a simplified structure.

BACKGROUND OF THE INVENTION

As is known, several types of implements which allow to ski are already commercially available.

Among these types of implements, there is already a frame which can be likened to a bicycle frame, has two very short skis instead of the wheels and is provided with an additional pair of skis which are locked to the feet of the rider.

The skis allow to steer the implement effectively while sitting.

This type of implement, besides being excessively bulky and heavy, is not safe, since it provides a stable connection to the user with the possibility of damage in case of falls or the like.

SUMMARY OF THE INVENTION

The aim of the invention is to solve the problem described above by providing a skiing implement having a simplified structure, which allows to have absolute safety, since the legs and arms are not anchored to the implement and convenient apres-ski or walking boots are sufficient for use.

The implement can be used easily even by people who are not particularly expert, since the setup for use is practically imposed by the implement proper.

Within this aim, an object of the invention is to provide an implement which can be steered easily like a conventional bicycle and furthermore, if required, can be converted so that it can be used both on snow and on lawns.

Another object of the present invention is to provide an implement which thanks to its particular constructive characteristics is capable of giving the greatest assurances of reliability and safety in use.

Still another object of the present invention is to provide an implement which can be obtained easily starting from commonly commercially available elements and materials and is also competitive from a merely economical standpoint.

This aim and these and other objects, which will become better apparent hereinafter, are achieved by a skiing implement having a simplified structure, according to the invention, characterized in that it comprises an elongated frame which defines, in a central portion, supports for the feet of a user and, at the front end, a head tube for rotary engagement with a steering column, a front ski connected to the lower end of said steering column and a rear ski connected to the rear end of said frame being further provided, said skis being connected so that they can oscillate about substantially horizontal axes.

BRIEF DESCRIPTION OF THE DRAWINGS

Further characteristics and advantages will become better apparent from the description of a preferred but not exclusive embodiment of a skiing implement having a simplified structure, illustrated by way of non-limiting example in the accompanying drawings, wherein:

FIG. 7 is a perspective view of the implement converted for its use on lawns and the like;

DESCRIPTION OF THE PREFERRED EMBODIMENTS

Figure 1:
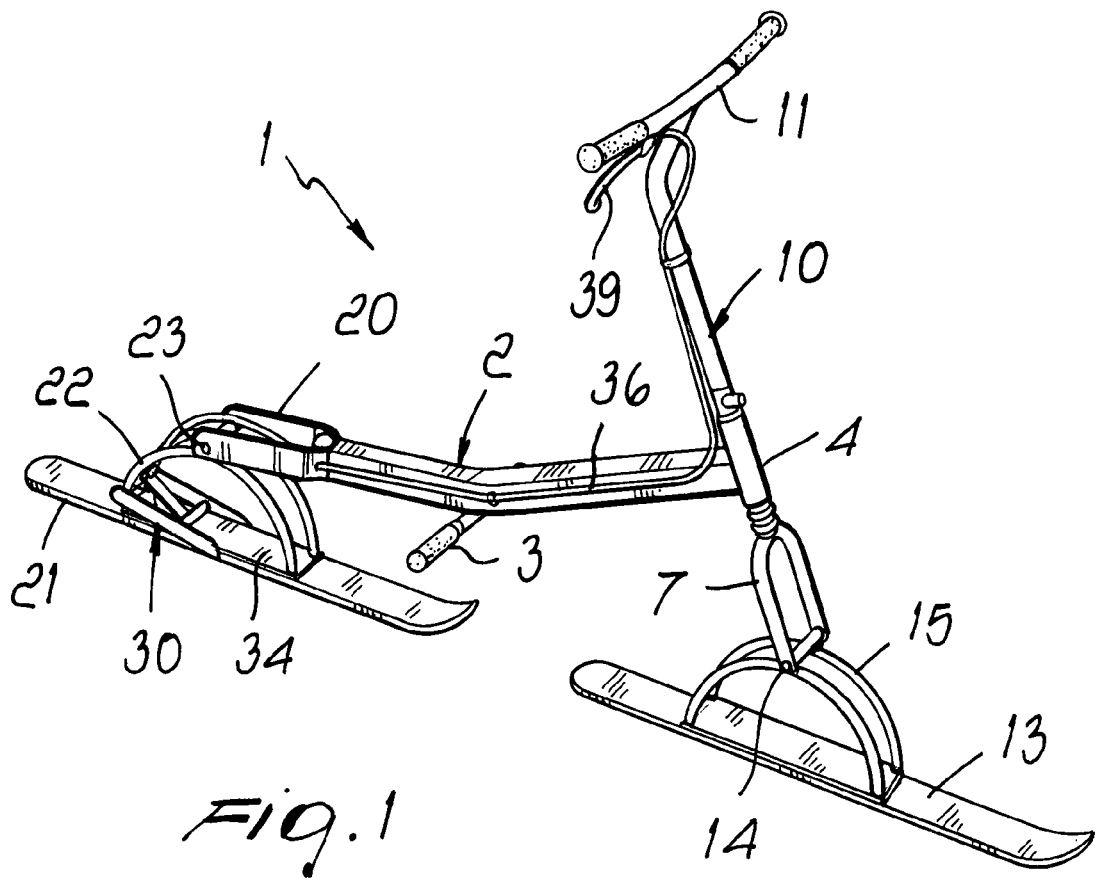
FIG. 1 is a perspective view of the implement according to the invention.
Figure 2:
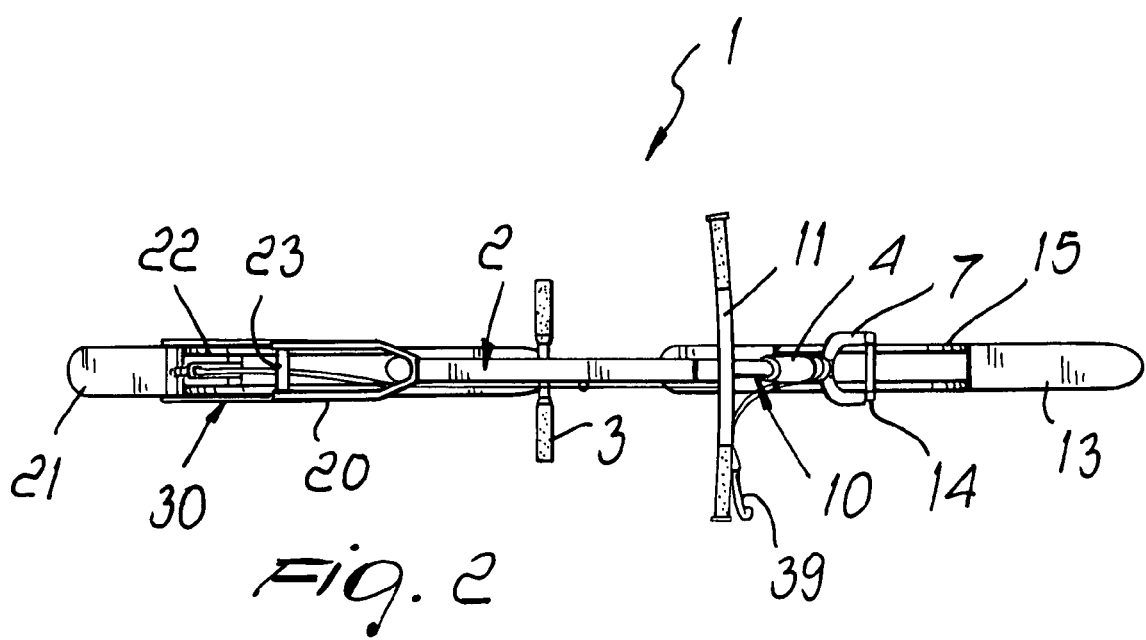
FIG. 2 is a top plan view of the implement.
Figure 3:
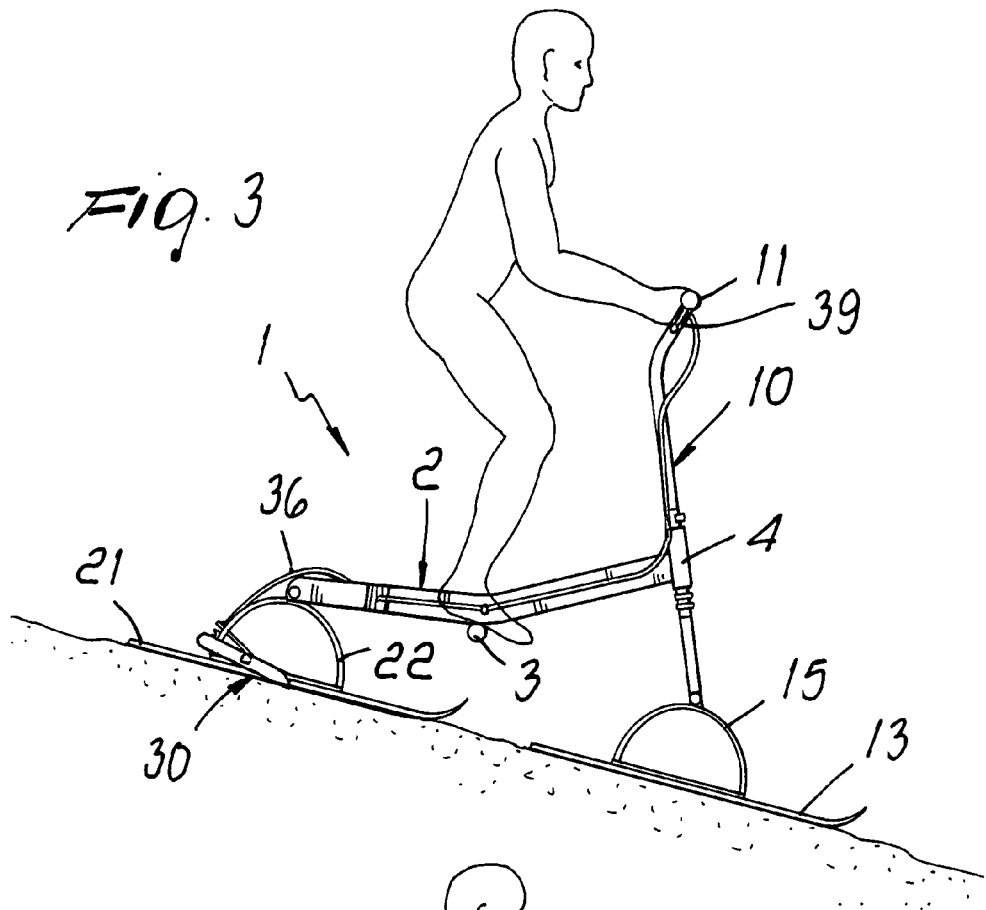
FIGS. 3 and 4 are schematic views of the implement during use.
Figure 4:
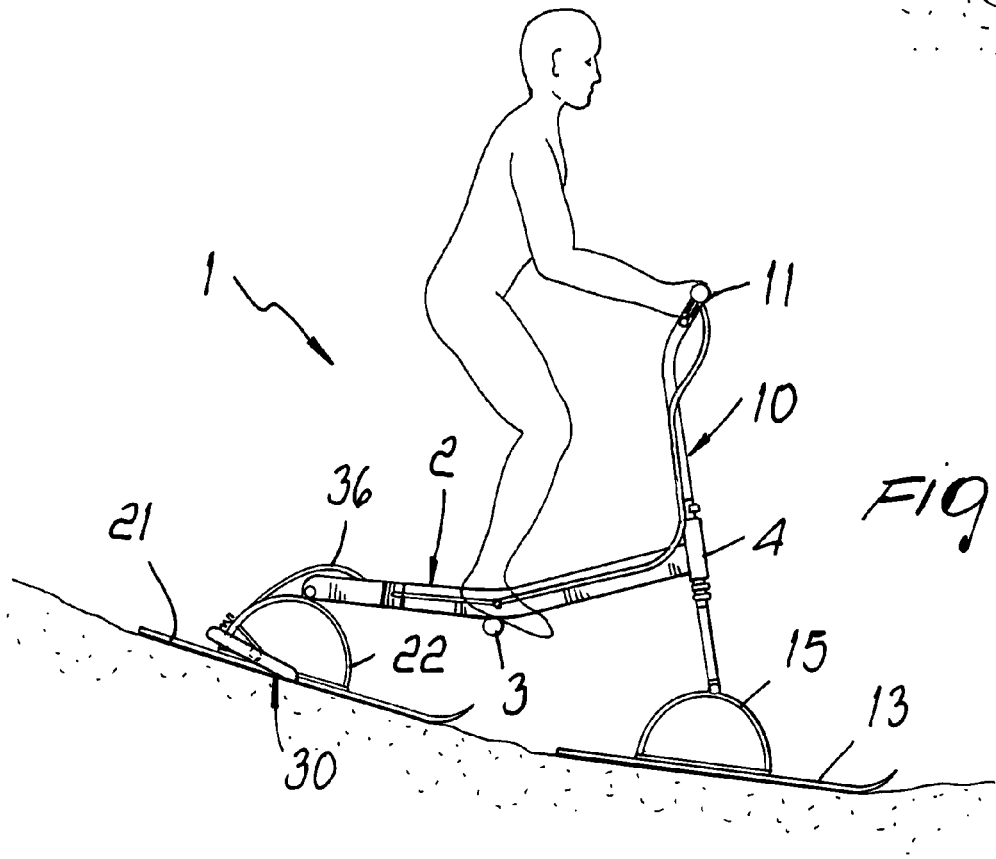
Figure 5:
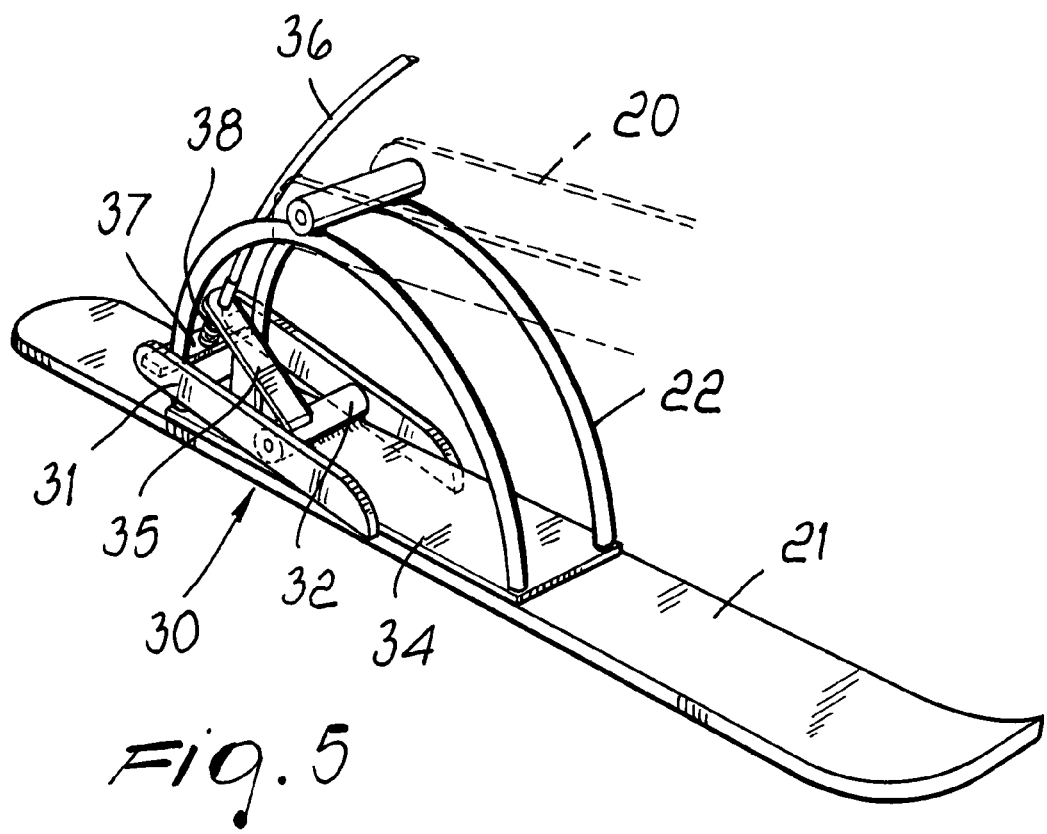
FIG. 5 is a perspective view of a detail of a rear brake.
Figure 6:
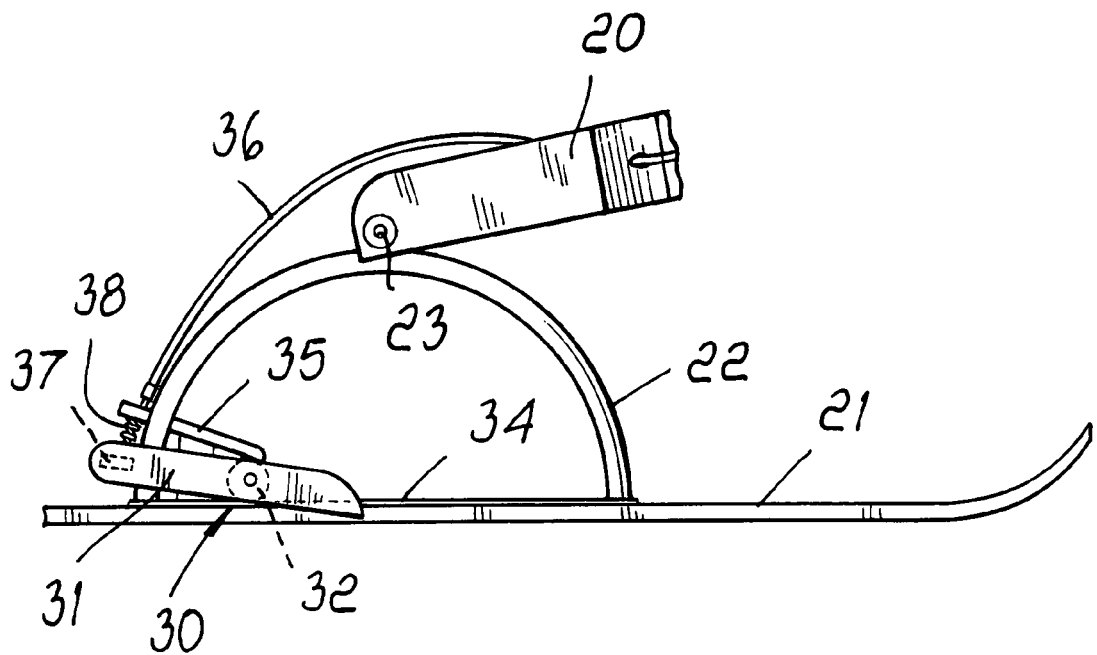
FIG. 6 is a side elevation view of the brake.
Figure 7:
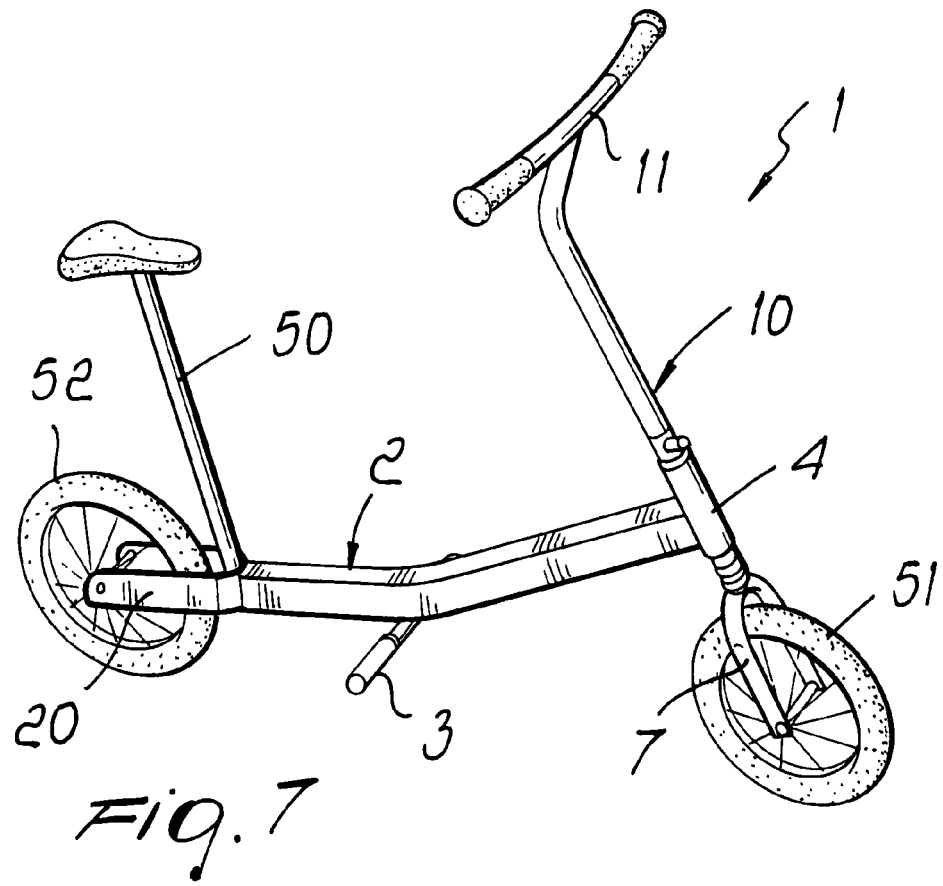
Figure 8:
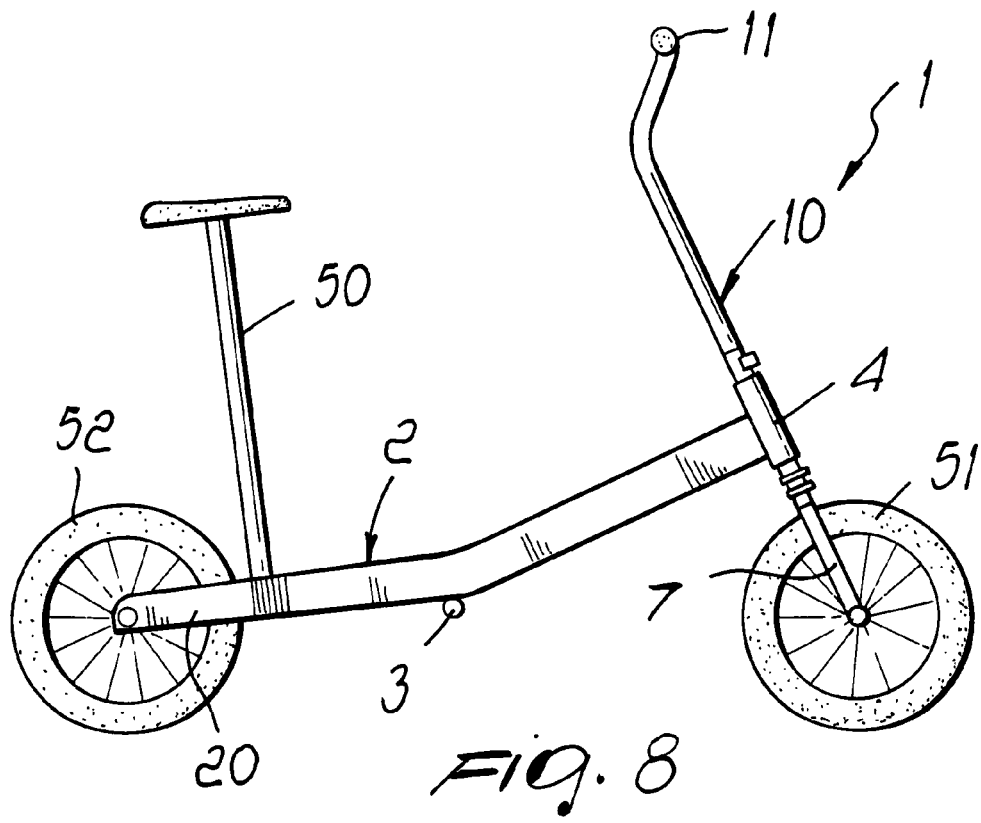
FIG. 8 is a side elevation view of the converted implement.

With reference to the figures, the skiing implement having a simplified structure according to the invention, generally designated by the reference numeral 1, comprises an elongated frame 2, which is constituted advantageously by a tubular body having a suitable cross-section, which in a central portion defines supports 3 for the feet of the user, said supports protruding transversely with respect to the frame 2.

The frame 2 is connected, at the front end, to a head tube 4 which advantageously is inclined by approximately 15-20° with respect to the vertical, and for this purpose the frame, in its front portion, is preferably inclined upwardly and sized and structured so as to keep the center of gravity low during use.

A steering column 10 engages rotatably at the head tube or sleeve 4 and has a handlebar 11 in an upward region and is pivoted in a downward region to a front ski 12 by means of a front pivot 14, which is arranged substantially horizontally and is articulated to a front bracket 15 which is fixed to the ski.

At the rear end, the frame 2 has advantageously a rear fork 20, which is articulated to a rear ski 21 provided with a rear bracket 22, which is connected to the fork 20 by means of a rear pivot 23.

With this structure it is possible to handle turns adequately by shifting the weight of the skier on the downhill ski, which, as shown schematically in the figures, can bend so as to allow to set up the turn.

Advantageously, the ski can have a central sidecut, so that together with the lamina of the ski it is possible to have a grip which is sufficient to trace a number of consecutive turns on the snow.

In order to increase safety in use, it is possible to provide a rear brake, generally designated by the reference numeral 30, provided by means of oscillating brake levers 31 which are pivoted so that they can oscillate about a transverse direction with respect to the rear ski 21 in a bush 32 which is rigidly coupled to the plate 34 for connecting the rear bracket 22.

A fixed lever 35 is associated with the bush 32 and acts as abutment for the sheath of a cable 36, advantageously of the Bowden type, which is connected to a crossmember 37 which joins the two brake levers 31.

Elastic means 38 act between the fixed lever 35 and the crossmember 37 and are designed to keep the brake levers in a raised position, while actuation by means of the brake lever 39 arranged on the handlebar overcomes the elastic contrast of the spring 38, turning the brake levers 31, with consequent engagement with the snow.

In this manner it is possible to apply a braking action which allows particularly safe use.

Moreover, a peculiar feature of the invention consists in that the implement can be easily converted for use for example on lawns and the like, and for this purpose, it is possible to provide a saddle 50, which can be fixed to the frame, and to apply, instead of the front and rear skis, a front wheel 51 and a rear wheel 52, which engage respectively the rear fork 20 and, instead of the front ski, the front fork 7 provided at the lower end of the steering column.

In this case also, it is possible to use the cable to connect it optionally to a suitable rear brake.

From what has been described above it is therefore evident that the invention achieves the proposed aim and objects and in particular the fact is stressed that a combination of elements is provided which, due to the particular angle of the head tube of the steering system, combined with the skis articulated by means of two brackets which are articulated to the frame, allows to achieve an implement which is maneuverable and easy to use.

It is further possible to provide optionally a shock absorber which is interposed on the steering column thereby making use more comfortable.

The invention thus conceived is susceptible of numerous modifications and variations, all of which are within the scope of the appended claims.

All the details may further be replaced with other technically equivalent elements.

In practice, the materials used, as well as the contingent shapes and dimensions, may be any according to requirements.

What is claimed is:

1. A skiing implement with a low center of gravity, comprising an elongated frame, feet supports for supporting feet of a user, an elongated head tube, a steering column, a front pivot, a rear pivot, a front ski and a rear ski, an entirety of the elongated frame consisting of a single tube having a central region and having a bend at the central region, said bend being closer to a location equidistant from both the elongated head tube and the rear pivot than to either the elongated head tube or the rear pivot, the feet supports being closer to the bend than to either the elongated head tube or the rear pivot, the elongated head tube being in rotary engagement with the steering column, the front ski being connected to a lower end of said steering column and the rear ski being connected to a rear end of said single tube by means of respective ones of the front and rear pivots, said front and rear skis being connected to oscillate about substantially horizontal axes, said feet supports and the rear pivot being located substantially at a same height with respect to ground when the skiing implement is upright upon a flat surface of the ground, the elongated head tube being inclined at an angle of 15-20° with respect to vertical, the elongated frame extending from the rear pivot to the elongated head tube so that, with the ski implement upright, the elongated frame engages the head tube at an elevation higher than that of the rear pivot.

2. The skiing implement according to claim 1, comprising, at the rear end of said elongated frame, a rear fork for oscillation of said rear ski.

3. The skiing implement according to claim 2, comprising a rear bracket which is associated with said rear ski and is connected by means of the rear pivot to said rear fork.

4. The skiing implement according to claim 3, comprising a braking element at said rear ski.

5. The skiing implement according to claim 4, wherein said braking element comprises two oscillating brakes which are pivoted at a bush which is rigidly coupled to a plate for the connection of said rear bracket, a fixed abutment lever for a sheath of a cable associated with a brake lever arranged on the skiing implement being rigidly coupled to said bush, a cross-member being further provided which joins said oscillating brakes, elastic means acting between said abutment lever and said crossmember and being adapted to keep said oscillating brakes in a raised position.

6. The skiing implement according to claim 1, comprising a handlebar, which is connected to an upper end of said steering column.

7. The skiing implement according to claim 1, comprising, at said front ski, a front bracket which is articulated to said steering column by means of the front pivot.

8. The skiing implement according to claim 1, comprising a saddle, which can be coupled detachably to said elongated frame.

9. The skiing implement according to claim 1, wherein said front and rear skis each have a central sidecut.

10. The skiing implement according to claim 1, comprising a front wheel and a rear wheel, which can be positioned so as to replace said front and rear skis.

11. The skiing implement according to claim 1, comprising a shock absorber which is interposed on said steering column.

12. The skiing implement according to claim 1, wherein the front end of the elongated frame has a constraining region along which connects the elongated head tube, the elongated frame having a change in inclination at the central region so that an angle of inclination of the elongated frame between the central region and the constraining region is greater than between a rear end of the elongated frame and the central region.

13. The skiing implement according to claim 1, wherein the feet supports are located at an elevation lower than the bend with the ski implement upright.

* * * * *